United States Patent
Yoshida et al.

(10) Patent No.: US 11,867,380 B2
(45) Date of Patent: *Jan. 9, 2024

(54) WAVELENGTH CONVERSION MEMBER AND LIGHT EMITTING DEVICE

(71) Applicant: NICHIA CORPORATION, Anan (JP)

(72) Inventors: Shigeki Yoshida, Anan (JP); Hiroyuki Watanabe, Itano-gun (JP); Eri Matsuka, Anan (JP)

(73) Assignee: NICHIA CORPORATION, Anan (JP)

( * ) Notice: Subject to any disclaimer, the term of this patent is extended or adjusted under 35 U.S.C. 154(b) by 254 days.

This patent is subject to a terminal disclaimer.

(21) Appl. No.: 17/443,141

(22) Filed: Jul. 21, 2021

(65) Prior Publication Data

US 2022/0026046 A1 Jan. 27, 2022

(30) Foreign Application Priority Data

Jul. 22, 2020 (JP) .................................. 2020-125709

(51) Int. Cl.
  *F21V 9/30* (2018.01)
  *C09K 11/77* (2006.01)
  *F21Y 115/30* (2016.01)

(52) U.S. Cl.
  CPC ............ *F21V 9/30* (2018.02); *C09K 11/7774* (2013.01); *C09K 11/77747* (2021.01); *F21Y 2115/30* (2016.08)

(58) Field of Classification Search
  CPC . F21V 9/30; C09K 11/7774; C09K 11/77747; F21Y 2115/30
  See application file for complete search history.

(56) References Cited

U.S. PATENT DOCUMENTS

| | | | |
|---|---|---|---|
| 11,597,879 B2* | 3/2023 | Yoshida | C09K 11/77747 |
| 2015/0211712 A1 | 7/2015 | Yoshimura et al. | |
| 2017/0342322 A1* | 11/2017 | Suzuki | C09K 11/7774 |
| 2019/0031956 A1* | 1/2019 | Inata | H01L 33/502 |
| 2020/0010760 A1 | 1/2020 | Ueda et al. | |
| 2020/0011507 A1 | 1/2020 | Nagasaki et al. | |

(Continued)

FOREIGN PATENT DOCUMENTS

| | | |
|---|---|---|
| EP | 3647836 A1 | 5/2020 |
| EP | 3677934 A1 | 7/2020 |

(Continued)

*Primary Examiner* — Tracie Y Green
(74) *Attorney, Agent, or Firm* — Hunton Andrews Kurth LLP

(57) ABSTRACT

A wavelength conversion member includes a support and a wavelength conversion layer including a first phosphor having a composition represented by Formula (1) and having an emission peak wavelength in a range from 550 nm to 620 nm, and a second phosphor having a different emission peak wavelength and/or a full width at half maximum from the first phosphor. An amount of the first phosphor in the wavelength conversion layer is in a range from 20 mass % to 80 mass % relative to a total amount of the phosphors In Formula (1), $M^1$ represents at least one of rare earth elements other than La and Ce, a total molar content percentage of Y, Gd, and Lu in $M^1$ is 90% or more, and p, q, r, and s satisfy $2.7 \leq (p+q+r) \leq 3.3$, $0 \leq r \leq 1.2$, $10 \leq s \leq 12$, and $0 < q \leq 1.2$.

$$La_p Ce_q M^1_r Si_6 N_s \qquad (1)$$

9 Claims, 10 Drawing Sheets

(56) References Cited

U.S. PATENT DOCUMENTS

2021/0102117 A1 4/2021 Hamada et al.
2021/0149097 A1 5/2021 Sugio et al.

FOREIGN PATENT DOCUMENTS

| JP | 2013130605 A | 7/2013 |
| JP | 2015142046 A | 8/2015 |
| JP | 2018142531 A | 9/2018 |
| JP | 2019020198 A | 2/2019 |
| JP | 2019039992 A | 3/2019 |
| WO | 2018/159268 A1 | 9/2018 |
| WO | 2018/163830 A1 | 9/2018 |
| WO | 2018/198949 A1 | 11/2018 |
| WO | 2019/003927 A1 | 1/2019 |
| WO | 2019/044409 A1 | 3/2019 |
| WO | 2020/129358 A1 | 6/2020 |

* cited by examiner

WAVELENGTH CONVERSION MEMBER AND LIGHT EMITTING DEVICE

CROSS-REFERENCE TO RELATED APPLICATION

This application claims priority to Japanese Patent Application No. 2020-125709, filed on Jul. 22, 2020, the disclosure of which is hereby incorporated by reference in its entirety.

BACKGROUND

The present disclosure relates to a wavelength conversion member and a light emitting device.

An increase in the output of a light source device is expected, for example, in an image projection device (projector) that displays a color image by projecting light emitted from the light source device onto a screen through a micromirror display element or the like. For example, Japanese Patent Application Publication No. 2013-130605 proposes a high-luminance light source device that uses a semiconductor light emitting element and exhibits a high light utilization efficiency.

SUMMARY

A light emitting device may be required to have an even higher light emission intensity in a red wavelength range, for example. Thus, an object of one aspect of the present disclosure is to provide a wavelength conversion member that can configure a light emitting device with good light emission characteristics.

A first aspect of the present disclosure is a wavelength conversion member provided with a support and a wavelength conversion layer, the wavelength conversion layer being disposed on the support and containing phosphors. The phosphors constituting the wavelength conversion member include a first phosphor having a composition represented by Formula (1), and having an emission peak wavelength in a wavelength range from 550 nm to 620 nm, and a second phosphor having a different emission peak wavelength and/or a full width at half maximum from the first phosphor. An amount of the first phosphor in the wavelength conversion layer is in a range from 20 mass % to 80 mass % relative to a total amount of the phosphors:

$$\text{La}_p\text{Ce}_q\text{M}^1_r\text{Si}_6\text{N}_8 \qquad (1)$$

In Formula (1), $M^1$ represents at least one selected from rare earth elements other than La and Ce, and includes at least one selected from the group consisting of Y, Gd, and Lu, and a total molar content percentage of Y, Gd, and Lu in $M^1$ is 90% or more. Further, p, q, r, and s satisfy: $2.7 \leq (p+q+r) \leq 3.3$, $0 \leq r \leq 1.2$, $10 \leq s \leq 12$, and $0 < q \leq 1.2$.

A second aspect of the present disclosure is a light emitting device provided with the above-mentioned wavelength conversion member and a light emitting element having an emission peak wavelength in a wavelength range from 350 nm to 500 nm.

According to one aspect of the present disclosure, a wavelength conversion member that can configure a light emitting device with good light emission characteristics can be provided.

DETAILED DESCRIPTION

Figure 1:
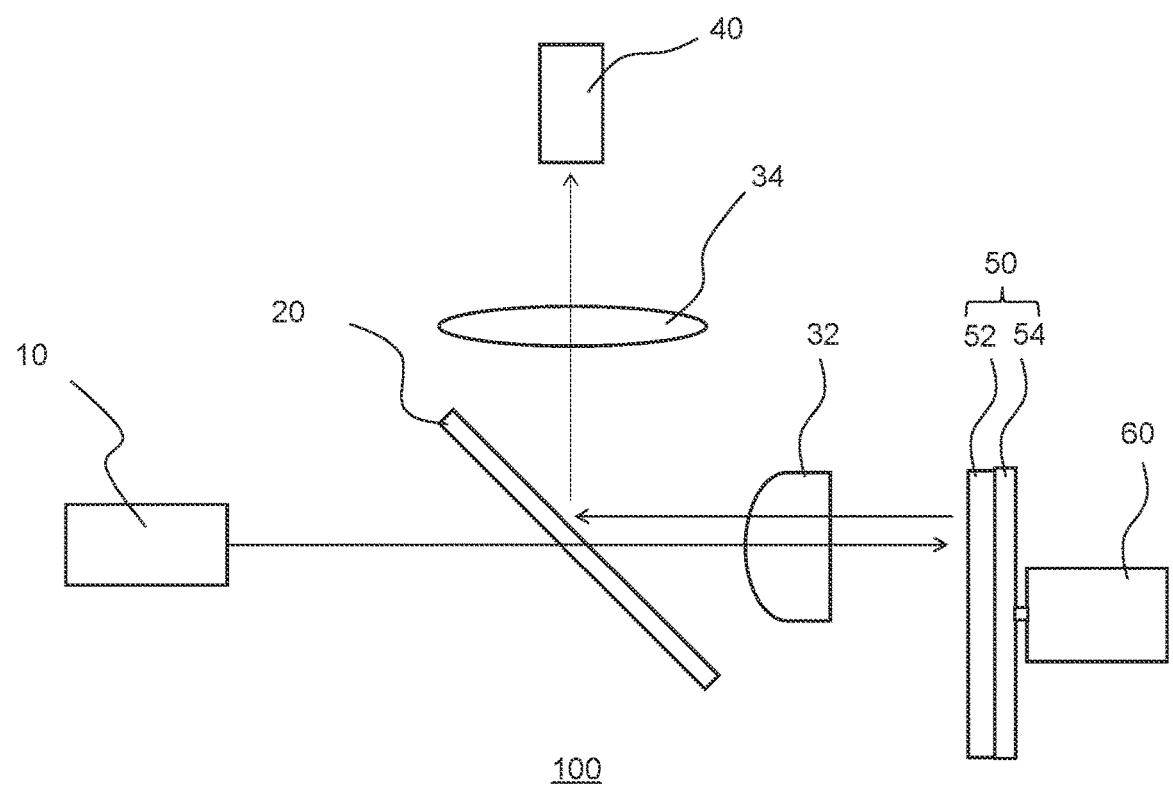
FIG. 1 is a schematic configurational diagram explaining a method for measuring light emission characteristics of a wavelength conversion member.

The word "step" herein is included in the present terminology if the anticipated purpose of the step is achieved in the case of not only an independent step, but also a step that cannot be clearly distinguished from another step. If a plurality of substances applicable to each component in a composition are present, the content of each component in the composition means the total amount of the plurality of substances present in the composition, unless otherwise specified. The relationship between a color name and chromaticity coordinates, the relationship between a wavelength range of light and the color name of monochromatic light, and the like follow the stipulations of JIS Z8110. The full width at half maximum of a phosphor means a wavelength width of an emission spectrum at which a light emission intensity of 50% of the maximum light emission intensity is exhibited in the emission spectrum of the phosphor. The average particle size of the phosphor is a volume average particle size, and refers to the particle size corresponding to a volume accumulation of 50% from the small diameter side in a particle size distribution based on volume. The particle size distribution of the phosphor is measured using a particle size distribution measurement device according to a pore electrical resistance method (electrical sensing zone method) based on the Coulter principle. Embodiments of the present invention will be described below in detail. The embodiments presented below exemplify wavelength conversion members and light emitting devices that embody the technical concept of the present invention, but the present invention is not limited to the wavelength conversion members and light emitting devices presented below. Note that the members presented in the claims are not in any way limited to the members of the embodiments. In addition, dimensions, materials, shapes, relative arrangements, or the like of constituent members described in the embodiments are not intended to limit the scope of the present invention thereto, unless otherwise specified, and are merely exemplary. Note that the size, positional relationship, or the like of members illustrated in the drawings can be exaggerated for clarity of description. Further, in the following description, members having the same terms and reference signs represent the same or similar members, and the detailed description thereof will be omitted as appropriate. Furthermore, each of the elements constituting the present invention may have a configuration in which a plurality of elements are constituted by the same member, and a plurality of elements may be used as a single member, or conversely, the function of one member may be shared by a plurality of members and realized. In addition, the details described in some of the examples and embodiments can be used in other examples, embodiments, and the like.

Wavelength Conversion Member

The wavelength conversion member is provided with a support and a wavelength conversion layer that is disposed on the support and includes phosphors. The phosphors constituting the wavelength conversion layer include at least one type of a first phosphor having a composition represented by Formula (1) and an emission peak wavelength in a wavelength range from 550 nm to 620 nm, and at least one type of a second phosphor with which an emission peak wavelength and/or a full width at half maximum differs from that of the first phosphor:

$$\text{La}_p\text{Ce}_q\text{M}^1_r\text{Si}_6\text{N}_s \quad (1)$$

In Formula (1), $M^1$ represents at least one selected from the group consisting of rare earth elements other than La and Ce, and includes at least one selected from the group consisting of Y, Gd, and Lu, and a total molar content percentage of Y, Gd, and Lu relative to the total molar amount of $M^1$ is 90% or more. Further, p, q, r, and s satisfy: $2.7 \leq (p+q+r) \leq 3.3$, $0 \leq r \leq 1.2$, $10 \leq s \leq 12$, and $0 < q \leq 1.2$.

The wavelength conversion member can be provided with a wavelength conversion layer that contains a first phosphor having a specific composition and activated by cerium (Ce), and a second phosphor having a different emission peak wavelength and/or a full width at half maximum from the first phosphor, with the content percentage of the first phosphor being in a predetermined range, and thereby a light emitting device configured by the wavelength conversion member can exhibit light emission characteristics with good linearity in accordance with the output of the light emitting element, and exhibit good light emission characteristics. Furthermore, light emission characteristics with good color reproducibility can be achieved by including two or more types of phosphors with which emission peak wavelengths and/or full width at half maximums differ from each other.

First Phosphor

The emission peak wavelength of the first phosphor may be 550 nm or greater, and preferably 555 nm or greater, 560 nm or greater, or 570 nm or greater. The emission peak wavelength of the first phosphor may be 620 nm or less, and preferably 610 nm or less, or 600 nm or less. When the emission peak wavelength is in the above-mentioned wavelength range, long-wavelength components (for example, red) in the emission spectrum increase, leading to a tendency for light emission characteristics to be obtained with good color reproducibility. For example, in the composition of the first phosphor, the long-wavelength component can be increased by increasing the content ratio of cerium. At this time, concentration quenching, a decrease in temperature characteristics and the like, and a reduction in light emission efficiency at high output excitation can be suppressed by appropriately controlling the content ratio of cerium. Long-wavelength components can also be increased by substituting some of the lanthanum with a rare earth element $M^1$ having a smaller ionic radius, such as yttrium or gadolinium. When such a substitution is made, the content ratio of the substitution element can be appropriately controlled to thereby suppress the generation of strain, defects, and the like in the crystal structure, and suppress issues such as a decrease in linearity with respect to excitation light output and luminance saturation with respect to excitation light. When considering color rendering, color reproducibility, and the like with respect to the use of phosphors under high output excitation in this manner, it is desirable to consider not only the increase of the emission spectrum in the loner wavelength range, but also factors such as the substitution element and activation element.

The full width at half maximum in the emission spectrum of the first phosphor may be, for example, 100 nm or greater, and is preferably 110 nm or greater, 115 nm or greater, or 120 nm or greater. The full width at half maximum may be, for example, 150 nm or less, and is preferably 140 nm or less, or 130 nm or less. When the full width at half maximum of the first phosphor is in the ranges described above, a light emitting device having a higher luminance tends to be obtained, and long-wavelength components (for example, red) in the emission spectrum tend to increase.

The composition of the first phosphor may include lanthanum (La), cerium (Ce), at least one rare earth element $M^1$ other than lanthanum (La) and cerium (Ce), silicon (Si), and nitrogen (N). Cerium may be included in the composition of the first phosphor as an activation element, and may be the emission center of the first phosphor. The rare earth element $M^1$ is at least one selected from the group consisting of scandium (Sc), yttrium (Y), praseodymium (Pr), neodymium (Nd), promethium (Pm), samarium (Sm), europium (Eu), gadolinium (Gd), terbium (Th), dysprosium (Dy), holmium (Ho), erbium (Er), thulium (Tm), ytterbium (Yb), and lutetium (Lu). The rare earth element $M^1$ may include at least one selected from the group consisting of at least yttrium (Y), gadolinium (Gd), and lutetium (Lu), and preferably includes at least yttrium (Y). The total molar content percentage of yttrium (Y), gadolinium (Gd), and lutetium (Lu) relative to the total molar amount of the rare earth elements $M^1$ included in the first phosphor may be, for example, 90% or more, and is preferably 95% or more, or 98% or more. Furthermore, the molar content percentage of yttrium (Y) relative to the total molar amount of the rare earth elements $M^1$ included in the first phosphor may be, for example, 90% or more, and is preferably 95% or more, or 98% or more.

When the amount of silicon is set to 6 mol, the composition of the first phosphor may have a molar content ratio of lanthanum in a range from 0.3 to 3.0, and preferably from 1.2 to 2.5, a molar content ratio of the rare earth element $M^1$ in a range from 0 to 1.2, and preferably from 0.3 to 1.0, a molar content ratio of cerium in a range from 0 to 1.2, and preferably from 0.15 to 1.0, and a molar content ratio of nitrogen in a range from 10 to 12, and preferably from 10.5 to 11.5. The first phosphor may have a composition represented by Formula (1) below, for example.

$$\text{La}_p\text{Ce}_q\text{M}^1_r\text{Si}_6\text{N}_s \quad (1)$$

In Formula (1), $M^1$ represents at least one selected from rare earth elements other than La and Ce. $M^1$ may include at least one selected from the group consisting of Y, Gd, and Lu, and preferably includes at least Y. The total molar content percentage of Y, Gd, and Lu in $M^1$ is 90% or more, and preferably 95% or more. Furthermore, the molar content percentage of Y in $M^1$ may be 90%/a or more, and preferably 95% or more. In addition, p, q, r, and s satisfy $2.7 \leq (p+q+r) \leq 3.3$, $0 \leq r \leq 1.2$, $10 \leq s \leq 12$, and $0 < q \leq 1.2$, and preferably $2.9 \leq (p+q+r) \leq 3.1$, $0.3 \leq r \leq 1.0$, $10.5 \leq s \leq 11.5$, and $0 < q \leq 1.0$. Here, p may satisfy $0.3 \leq p \leq 3.0$, and preferably satisfies $1.2 \leq p \leq 2.5$.

In the composition of the first phosphor, some of the rare earth elements $M^1$ may be substituted with at least one selected from the group consisting of group II elements, and are preferably substituted with at least one selected from the group consisting of Mg and alkaline earth metal elements. When some of the rare earth elements $M^1$ are substituted with another element other than a rare earth element, the molar content percentage of the other element in the rare earth elements $M^1$ is, for example, 10% or less, and preferably 5% or less, or 3% or less. The molar content percentage of the other element may be, for example, 1.0% or more, and is preferably 0.01% or more. When some of the rare earth elements $M^1$ are substituted with another element, the total molar content percentage of yttrium (Y), gadolinium (Gd), and lutetium (Lu) relative to the total molar amount of the rare earth elements $M^1$ included in the first phosphor may be, for example, 90% or more, and is preferably 95% or more, or 98% or more. Furthermore, the molar content percentage of yttrium (Y) relative to the total molar amount of the rare earth elements $M^1$ contained in the first phosphor may be, for example, 90% or more, and is preferably 95% or more, or 98% or more.

In the composition of the first phosphor, some of the silicon may be substituted with at least one selected from the group consisting of boron (B), aluminum (Al), gallium (Ga), and germanium (Ge). When some of the silicon is substituted with an element other than silicon, the molar content percentage of the element other than silicon relative to the total number of moles of silicon and elements other than silicon in the composition is, for example, 50% or less, and preferably 20% or less, or 10% or less. The molar content percentage of the elements other than silicon may be, for example, 0.01% or more, and is preferably 5% or more. When some of the silicon in the composition of the first phosphor is substituted with an element other than silicon, the total molar content percentage of the aluminum and silicon relative to the total number of moles of silicon and elements other than silicon may be, for example, 90% or more, and is preferably 95% or more, or 98% or more.

From the perspective of light emission intensity, the particle size and particle size distribution of the first phosphor preferably exhibit a particle size distribution with a single peak. The average particle size of the first phosphor may be, for example, in a range from 1 μm to 100 μm, and is preferably in a range from 5 μm to 70 μm, or a range from 10 μm to 50 μm.

Relative to the total mass of the phosphors constituting the wavelength conversion member, the content of the first phosphor in the phosphors may be, for example, in a range from 5 mass % to 95 mass %, and is preferably 20 mass % or more, 25 mass % or more, or 30 mass % or more, and preferably 80 mass % or less, 75 mass % or less, or 70 mass % or less. The phosphors may include one type of the first phosphor alone, or may include two or more types with which emission peak wavelengths and/or full widths at half maximum differ from each other.

Second Phosphor

The wavelength conversion layer includes, as a phosphor, at least one type of second phosphor in addition to the first phosphor. The second phosphor need only be that an emission peak wavelength and/or a full width at half maximum differs from that of the first phosphor, and both the emission peak wavelength and the full width at half maximum of the second phosphor may differ from those of the first phosphor. The second phosphor may have, for example, a composition of a rare earth aluminate. The emission peak wavelength of the second phosphor may be, for example, in a range from 450 nm to 580 nm, and is preferably 490 nm or more, or 500 nm or more. The emission peak wavelength of the second phosphor may be, for example, 575 nm or less, and is preferably 570 nm or less, 550 nm or less, 530 nm or less, or 520 nm or less. The emission peak wavelength of the second phosphor may be, for example, in a range from 450 nm to 550 nm. When the emission peak wavelength is in the wavelength range described above, short-wavelength components (for example, green) increase, the color of the emission spectrum of the first phosphor can be complemented, and light emission characteristics that are better in color reproducibility of a light emitting device tend to be obtained. The full width at half maximum in the emission spectrum of the second phosphor may be, for example, 80 nm or greater, and is preferably 90 nm or greater, 100 nm or greater, or 120 nm or greater. The full width at half maximum may be, for example, 150 nm or less, and is preferably 140 nm or less, or 130 nm or less. The full width at half maximum in the emission spectrum of the second phosphor may be, for example, in a range from 90 nm to 130 nm. When the full width at half maximum of the second phosphor is in the ranges described above, a light emitting device having a higher luminance tends to be obtained. Also, short-wavelength components (for example, green) in the emission spectrum tend to increase.

The wavelength difference between the emission peak wavelength of the first phosphor and the emission peak wavelength of the second phosphor may be, for example, in a range from 20 nm to 120 nm, and is preferably 30 nm or more, 50 nm or more, or 60 nm or more, and preferably 100 nm or less, or 80 nm or less. When the wavelength difference between the emission peak wavelengths of the first phosphor and the second phosphor is in the ranges described above, the color reproducibility, color rendering properties, and the like of the light emitting device tend to be improved.

The wavelength conversion member may include, as the second phosphor, a plurality of phosphors with which emission peak wavelengths and/or full widths at half maximum differ from each other in the emission spectrum. Consequently, a light emitting device having a better color reproducibility can be configured. When the wavelength conversion member includes a plurality of second phosphors with different emission peak wavelengths, the wavelength difference between two types of second phosphors is, for example, in a range from 5 nm to 120 nm, and is preferably 10 nm or more, 15 nm or more, 20 nm or more, 30 nm or more, or 40 nm or more, and preferably 100 nm or less, or 90 nm or less. When the wavelength conversion member includes a plurality of types of second phosphors with different full widths at half maximum in the light emission spectrum, the difference in the full width at half maximum between two types of second phosphors is, for example, in a range from 1 nm to 50 nm, and is preferably 5 nm or more, or 10 nm or more, and preferably 30 nm or less, 25 nm or less, or 20 nm or less.

The wavelength conversion member may include two or more types of second phosphors having mutually different compositions. A first composition example of the second phosphor may be a rare earth aluminate containing, for example, lutetium (Lu), and at least one of gallium and aluminum. In the first composition example of the second phosphor, when the total number of moles of gallium and aluminum is 5 moles, the molar content ratio of lutetium may be, for example, in a range from 2.5 to 3.5, and is preferably in a range from 2.8 to 3.2. Furthermore, the molar content ratio of oxygen atoms when the total number of moles of gallium and aluminum is set to 5 moles may be, for example, in a range from 10 to 14, and is preferably in a range from 11 to 13. Furthermore, the molar content ratio of aluminum relative to the total number of moles of gallium and aluminum may be, for example, in a range from 0 to 1, and is preferably in a range from 0.6 to 1.0. Some of the lutetium in the first composition example of the second phosphor may be substituted with at least one type of element selected from the group consisting of alkaline earth metal elements and rare earth elements other than lutetium. In addition, some of the gallium and aluminum in the first composition example of the second phosphor may be substituted with at least one selected from the group consisting of silicon and germanium. The first composition example of the second phosphor may be a composition represented by Formula (2) below.

$$Lu_3(Ga,Al)_5O_{12}Ce \qquad (2)$$

The composition represented by Formula (2) is a theoretical composition, and the first composition example of the second phosphor may have a composition that differs from the theoretical composition as long as light emission characteristics equivalent to those of the second phosphor with the theoretical composition are obtained. For example, the first composition example of the second phosphor may be a composition represented by Formula (2-1) below.

$$Lu_i(Ga,Al)_5O_j:Ce \qquad (2\text{-}1)$$

In Formula (2-1), i and j may satisfy 2.5≤i≤3.5 and 10≤j≤14, and preferably satisfy 2.85≤i≤3.2 and 11≤j≤13. Furthermore, the first composition example of the second phosphor may be a composition represented by Formula (2-2) below.

$$Lu_i(Ga_{1-k}Al_k)_5O_j:Ce \qquad (2\text{-}2)$$

In Formula (2-2), i and j may satisfy 2.5≤i≤3.5, 10≤j≤14, and 0≤k≤1, and preferably satisfy 2.8≤i≤3.2, 11≤j≤13, and 0.6≤k≤1.

The emission peak wavelength of the second phosphor of the first composition example may be, for example, in a range from 450 nm to 560 nm, and is preferably 490 nm or more, 500 nm or more. The emission peak wavelength may be preferably 550 nm or less, 540 nm or less, or 530 nm or less. Furthermore, the full width at half maximum may be, for example, in a range from 80 nm to 150 nm, and is preferably 90 nm or more, or 95 nm or more, and preferably 140 nm or less, 130 nm or less, 120 nm or less, or 110 nm or less.

A second composition example of the second phosphor may be a rare earth aluminate containing, for example, yttrium (Y), and at least one of gallium and aluminum. In the second composition example of the second phosphor, when the total number of moles of gallium and aluminum is 5 moles, the molar content ratio of yttrium may be, for example, in a range from 2.5 to 3.5, and is preferably in a range from 2.8 to 3.2. Furthermore, the molar content ratio of oxygen atoms when the total number of moles of gallium and aluminum is set to 5 moles may be, for example, in a range from 10 to 14, and is preferably in a range from 11 to 13. Moreover, the molar content ratio of aluminum relative to the total number of moles of gallium and aluminum may be, for example, in a range from 0 to 1, and is preferably in a range from 0.4 to 1.0. Some of the yttrium in the second composition example of the second phosphor may be substituted with at least one selected from the group consisting of alkaline earth metal elements and rare earth elements other than yttrium. In addition, some of the gallium and aluminum in the second composition example of the second phosphor may be substituted with at least one selected from the group consisting of silicon and germanium. The second composition example of the second phosphor may be a composition represented by Formula (3) below.

$$Y_3(Ga,Al)_5O_{12}:Ce \qquad (3)$$

The composition represented by Formula (3) is a theoretical composition, and the second composition example of the second phosphor may have a composition that differs from the theoretical composition as long as light emission characteristics equivalent to those of the second phosphor with the theoretical composition are obtained. For example, the second composition example of the second phosphor may be a composition represented by Formula (3-1):

$$Y_l(Ga,Al)_5O_m:Ce \qquad (3\text{-}1)$$

In Formula (3-1), l and m may satisfy 2.5≤l≤3.5 and 10≤m≤14, and preferably satisfy 2.8≤l≤3.2 and 11≤m≤13. Furthermore, the second composition example of the second phosphor may be a composition represented by Formula (3-2) below.

$$Y_l(Ga_{1-n}Al_n)_5O_m:Ce \qquad (3\text{-}2)$$

In Formula (3-2), l, m, and n may satisfy 2.5≤l≤3.5, 10≤m≤14, and 0≤n≤1, and preferably satisfy 2.8≤l≤3.2, 11≤m≤13, and 0.4≤n≤1.

The emission peak wavelength of the second phosphor having the second composition example may be, for example, in a range from 450 nm to 580 nm, and is preferably 500 nm or more, 520 nm or more, or 550 nm or more. The emission peak wavelength may be preferably 575 nm or less, or 570 nm or less. In addition, the full width at half maximum may be, for example, in a range from 80 nm to 150 nm, is preferably 90 nm or more, 100 nm or more, or 110 nm or more, and preferably 140 nm or less, 130 nm or less, or 125 nm or less.

From the perspective of light emission intensity, the particle size and particle size distribution of the second phosphor preferably exhibit a particle size distribution with a single peak. The average particle size of the second phosphor may be, for example, in a range from 1 μm to 100 μm, and is preferably in a range from 5 μm to 70 μm, or a range from 10 μm to 50 μm.

Relative to the total mass of the phosphors constituting the wavelength conversion member, the content of the second phosphor in the phosphors may be, for example, in a range from 5 mass % to 95 mass %, and is preferably 20 mass % or more, 25 mass % or more, or 30 mass % or more, and preferably 80 mass % or less, 75 mass % or less, or 70 mass % or less. A ratio on a mass basis of the content of the second phosphor to the content of the first phosphor (second phosphor/first phosphor) may be, for example, in a range from 0.05 to 19, and is preferably 0.25 or more, or 0.33 or more, and preferably 4 or less, or 3 or less. When the wavelength conversion member contains two types of second phosphors as phosphors, the content ratio of the two types of second phosphors may be, for example, in a range from 5:1 to 10:1, and preferably from 1:1 to 3:1, as the content ratio of the first composition example to the second composition example.

Third Phosphor

In addition to the first phosphor and the second phosphor, the wavelength conversion member may further include at least one type of third phosphor with which the emission peak wavelength and/or the full width at half maximum differs from that of the first phosphor and the second phosphor. The third phosphor can be used to adjust the color, the light emission spectrum, and the like when configuring a light emitting device.

The emission peak wavelength of the third phosphor may be, for example, in a range from 450 nm to 680 nm, and is preferably 490 nm or more, or 500 nm or more. The emission peak wavelength of the third phosphor is preferably 650 nm or less, or 630 nm or less. For example, if the emission peak wavelength of the third phosphor is located on the longer wavelength side than the emission peak wavelength of the first phosphor, long-wavelength components (for example, red) in the light extracted from the wavelength conversion member tends to increase. In addition, if the emission peak wavelength of the third phosphor is located on the shorter wavelength side than the emission peak wavelength of the first phosphor, short-wavelength components (for example, green) of the light extracted from the wavelength conversion member tends to increase. Therefore, by appropriately controlling the emission peak wavelength of the third phosphor, the color reproducibility range can be adjusted when the light emission chromaticity or the like need to be adjusted with respect to the combination of the first phosphor and the second phosphor.

The half-value width in the emission spectrum of the third phosphor may be, for example, 50 nm or more, and is preferably 100 nm or more, 110 nm or more, or 120 nm or more. The half-value width may be, for example, 150 nm or less, and is preferably 140 nm or less, or 130 nm or less. When the half-value width of the third phosphor is in the ranges described above, a light emitting device having a higher luminance tends to be obtained, and short-wavelength components (for example, green) or long-wavelength components (for example, red) in the emission spectrum tends to increase. Furthermore, adjustments can be made in terms of the range of color reproduction, color rendering properties, and the like, and the desired wavelength component can be extracted according to the application or the like of the light emitting device.

The third phosphor may be at least one type selected from the group consisting of phosphors having a composition such as $(Y, Gd, Lu)_3(Al, Ga)_5O_2$, $(La, Y)_3Si_6N_{11}$, $(Sr, Ca)AlSiN_3$, $(Ca, Sr, Ba)_2Si_5N_8$, $(Ca, Sr, Ba)Si_2O_2N_2$, $(Ca, Sr, Ba)_2SiO_4$, $\alpha$-SiAlON, and $\beta$-SiAlON. An activator included in these phosphors is preferably Ce or Eu, and more preferably Ce.

From the perspective of light emission intensity, the particle size and particle size distribution of the third phosphor preferably exhibit a particle size distribution with a single peak. The average particle size of the third phosphor may be, for example, in a range from 1 μm to 100 μm, and is preferably in a range from 5 μm to 70 μm, or a range from 10 μm to 50 pin.

Relative to the total mass of the phosphors constituting the wavelength conversion member, the content of the third phosphor in the phosphors may be, for example, in a range from 5 mass % to 95 mass %, and is preferably 20 mass % or more, 25 mass % or more, or 30 mass % or more, and preferably 80 mass % or less, 75 mass % or less, or 70 mass % or less. A ratio on a mass basis of the content of the third phosphor to the content of the first phosphor (third phosphor/first phosphor) may be, for example, in a range from 0.05 to 19, and is preferably 0.25 or more, or 0.33 or more, and preferably 4 or less, or 3 or less.

The method for producing the first phosphor, the second phosphor, and the third phosphor is not particularly limited, and can be appropriately selected from known means. For example, the first, second, and third phosphors can be produced as follows. The individual elements, oxides, carbonates, nitrides, chlorides, fluorides, sulfides, and the like contained in the compositions of the phosphors are used as raw materials, and these raw materials are weighed so as to have a predetermined compositional ratio. Additionally, an additive material such as flux is further added to the raw materials as appropriate, and wet or dry mixed using a mixer. Consequently, a solid-state reaction can be promoted, and particles of a uniform size can be formed. Furthermore, as the mixer, a grinder such as a vibration mill, a roll mill, or a jet mill may be used, besides a ball mill that is commonly used in industrial applications. The specific surface area can also be increased by grinding using a grinder. In addition, in order to obtain a powder of which the specific surface area is in a certain range, the powder can be classified using a device that is commonly used in industrial applications, including a wet separator such as a settling tank, hydrocyclone, or centrifuge, or a dry classifier such as a cyclone or air separator. The mixed raw materials described above are supplied into a crucible of SiC, quartz, alumina, BN, or the like, and are fired in an inert atmosphere of argon, nitrogen, or the like, a reducing atmosphere containing hydrogen, or an oxidizing atmosphere in air. The firing is performed at a predetermined temperature for a predetermined period of time. The fired materials are ground, dispersed, and filtered, etc. to obtain a phosphor powder of interest. Solid-liquid separation can be performed by methods that are commonly used in industrial applications, such as filtration, suction filtration, pressure filtration, centrifugal separation, and decantation. Drying can be performed using a device that is commonly used in industrial applications, such as a vacuum dryer, a hot air heating dryer, a conical dryer, or a rotary evaporator.

The wavelength conversion layer may include a resin in addition to the phosphors. The resin is preferably a light-transmissive resin, and examples thereof include thermosetting resins such as epoxy resins, silicone resins, epoxy-modified silicone resins, and modified silicone resins. When the wavelength conversion member includes a resin, the content percentage of the resin in the wavelength conversion layer may be, for example, in a range from 15 mass % to 50 mass %, and is preferably 20 mass % or more, or 25 mass % or more, and preferably 45 mass % or less, or 40 mass % or less. One type of resin may be used alone, or two or more types may be used in combination. Furthermore, the wavelength conversion layer may include an inorganic binder such as glass in place of or in conjunction with the resin.

The wavelength conversion layer may further include other components in addition to the phosphors and resin. Examples of the other components include fillers such as silica, barium titanate, titanium oxide, and aluminum oxide, light stabilizers, and coloring agents. When the wavelength conversion member includes other components, the content thereof is not particularly limited, and can be appropriately selected according to the purpose and the like. For example, when a filler is included as another component, the content thereof can be set in a range from 0.01 parts by mass to 20 parts by mass per 100 parts by mass of the resin.

The thickness of the wavelength conversion layer may be, for example, in a range from 30 μm to 400 μm, and preferably in a range from 30 μm to 150 μm, or from 40 μm to 100 μm. Furthermore, the shape of the wavelength conversion layer may be appropriately selected according to the purpose and the like. The wavelength conversion layer may be disposed on one main surface of the support, for example, and may be disposed in a region of a portion of the main surface, or may be disposed on the entire main surface or substantially the entire main surface.

The wavelength conversion layer may be configured by a single layer including phosphors obtained by mixing the first phosphor and the second phosphor, and as necessary, the third phosphor. Alternatively, the wavelength conversion layer may be configured by layering a plurality of layers each containing one type of phosphors. When the wavelength conversion layer is configured by a plurality of layers, the layering order of the phosphors may be such that, for example, a wavelength conversion layer containing the second phosphor is layered on a wavelength conversion layer containing the first phosphor, or the layers may be in a reverse order thereof. Furthermore, when the wavelength conversion layer includes a plurality of types of second phosphors, each of the second phosphors may be included in the same wavelength conversion layer, or may be included in different wavelength conversion layers and layered to form the wavelength conversion layers.

Support

The support may be a light-transmissive member containing an inorganic light-transmissive material such as glass or alumina, for example. By configuring the support as a light-transmissive member, light incident on the wavelength conversion member can be wavelength converted and exits from a side opposite the incident surface. Of the light-transmissive member, the main surface on which the wavelength conversion layer is formed and/or the other opposing main surface may be pre-roughened through etching, laser machining, or the like, for example. Consequently, uneven light emission at the light emitting surface of the wavelength conversion member can be suppressed.

The support may also be a metal member containing a metal material such as aluminum or copper. By configuring the support using a metal member, light incident on the wavelength conversion member can be wavelength converted and exits from the same side as the incident surface. Such a configuration also results in better heat dissipation from the phosphors, and therefore the light emission efficiency of the phosphors can be improved. The thickness of the support is not particularly limited, and may be appropriately selected according to the purpose and the like.

Method for Producing Wavelength Conversion Member

A method for producing the wavelength conversion member is described below. The wavelength conversion member is produced by a production method that includes, for example, disposing a wavelength conversion layer containing phosphors on one main surface of a support.

The wavelength conversion layer may be formed on one main surface of the support by, for example, a printing method. Note that the method of forming the wavelength conversion layer is not limited to a printing method, and another known formation method such as, for example, compression molding, phosphor electrodeposition, or bonding of a phosphor sheet, or a combination of a printing method with these formation methods can be used as appropriate. When the wavelength conversion layer is formed by a printing method, in consideration of workability when printing and of suppressing uneven light emission of the wavelength conversion member, the thickness of the wavelength conversion layer may be, for example, in a range from 30 μm to 400 μm, and preferably in a range from 30 μm to 150 μm, or from 40 μm to 100 μm.

Printing Method

A phosphor paste containing phosphors and a binder is prepared, and the resulting phosphor paste is applied to the surface of the support. Phosphors described above can be used as the phosphors. In addition, as the binder, a resin such as a silicone resin, an epoxy resin, a phenol resin, or a polyimide resin, or an inorganic binder such as glass can be used. The phosphor paste may include a filler as necessary. As the filler, at least one type selected from the group consisting of silica, titanium oxide, barium titanate, aluminum oxide, and silicon oxide can be used. The phosphor paste may be applied, for example, by moving a squeegee across a screen plate placed on the support such that the phosphor paste passes through the screen plate, to thereby apply a predetermined thickness of the phosphor paste onto the support. Accordingly, the phosphor paste can be applied at a substantially uniform thickness.

With a desired phosphor distribution obtained in the phosphor paste, the binder of the phosphor paste is cured to form the wavelength conversion layer. The binder is cured by an appropriate method such as drying, heating, or ultraviolet irradiation, according to the type of binder.

Figure 2A:
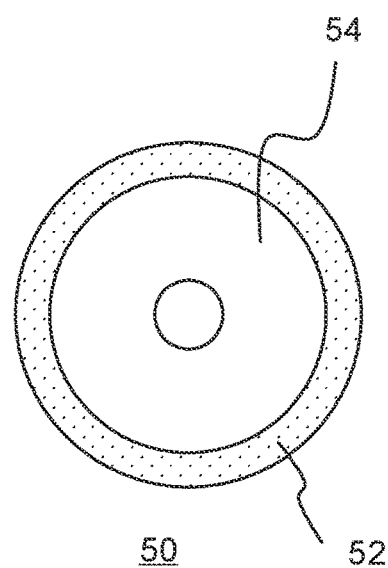
FIGS. 2A and 2B are schematic configurational diagrams illustrating an example of a wavelength conversion member.
Figure 2B:
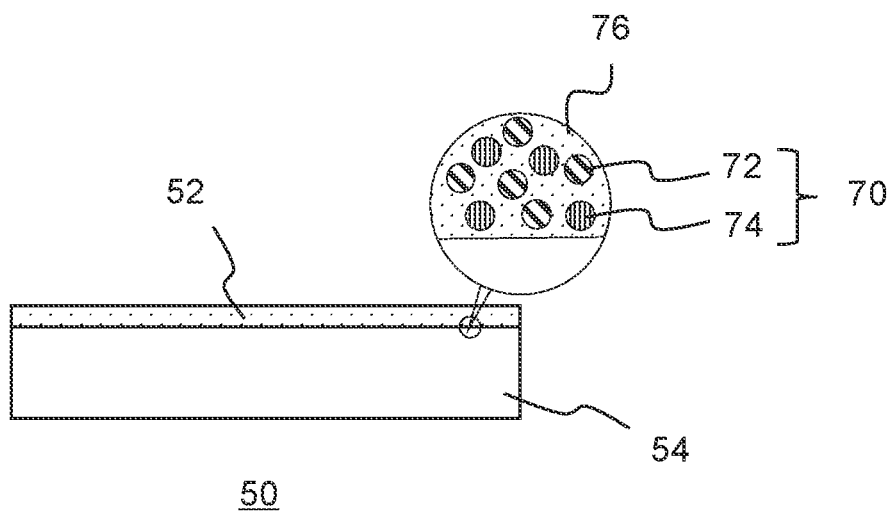

The wavelength conversion member can be obtained by a method described above. An example of the obtained wavelength conversion member is schematically illustrated in FIGS. 2A and 2B. FIG. 2A is a schematic plan view of a wavelength conversion member 50 as viewed from a main surface side, and FIG. 2B is a schematic plan view of the wavelength conversion member 50 as viewed from a lateral surface side. As illustrated in FIG. 2A, a wavelength conversion layer 52 is disposed along the circumference of a disk-shaped support 54. In addition, as illustrated in FIG. 2B, the wavelength conversion layer 52 includes a resin 76 and phosphors 70 including a first phosphor 72 and a second phosphor 74, and is disposed on one of the main surfaces of the support 54.

Figure 3A:
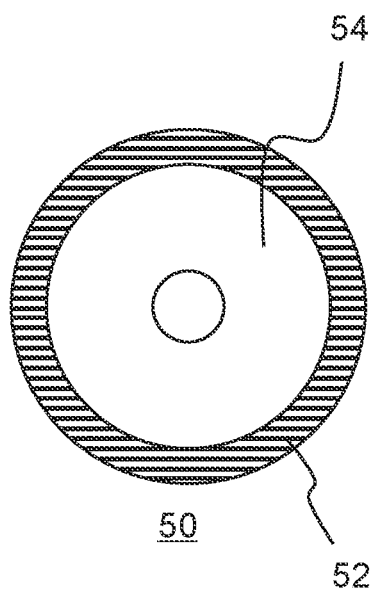
FIGS. 3A and 3B are schematic configurational diagrams illustrating another example of a wavelength conversion member.
Figure 3B:
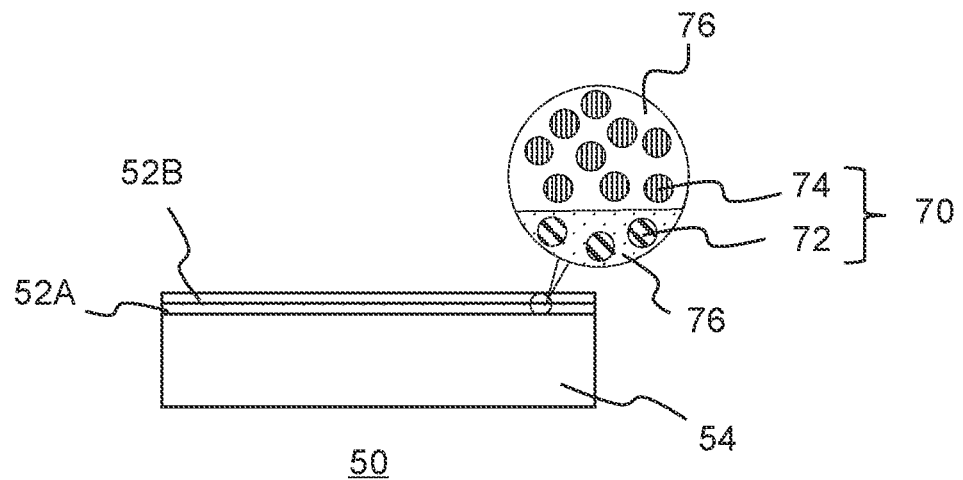
Figure 4A:
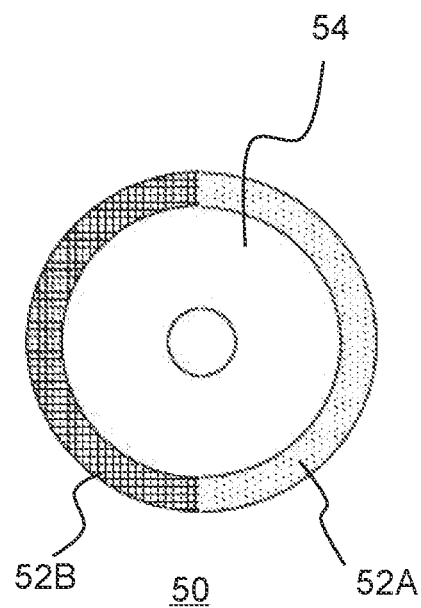
FIGS. 4A and 4B am schematic configurational diagrams illustrating another example of a wavelength conversion member.
Figure 4B:
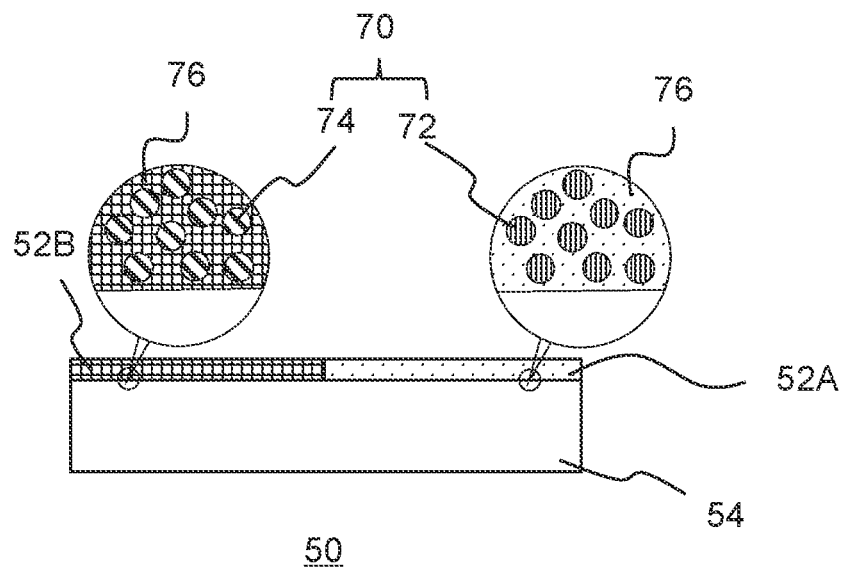

Note that with a printing method as described above, the type of phosphor contained in the phosphor paste can be changed, and a wavelength conversion member having a plurality of wavelength conversion layers with different types of phosphors contained therein can be configured. An example of such a wavelength conversion member is illustrated in FIGS. 3A and 3B. FIG. 3A is a schematic plan view of a wavelength conversion member 50 as viewed from a main surface side, and FIG. 3B is a schematic plan view of the wavelength conversion member 50 as viewed from a lateral surface side. As illustrated in FIG. 3A, a wavelength conversion layer 52 is disposed along the circumference of a disk-shaped support 54. Furthermore, as illustrated in FIG. 3B, a wavelength conversion layer 52A including the first phosphor 72 and the resin 76, and a wavelength conversion layer 52B including the second phosphor 74 and the resin 76 are layered and formed on one of the main surfaces of the support 54 with the wavelength conversion layer 52A being arranged below the wavelength conversion layer 52B. In FIG. 3B, the wavelength conversion layer 52B including the second phosphor 74 is layered on the wavelength conversion layer 52A including the first phosphor 72, but this layering order may be reversed. Further, in another aspect of the wavelength conversion member, a wavelength conversion member having a plurality of phosphor layers with different types of phosphors contained therein can be formed by changing the type of phosphor contained in the phosphor paste for each region to be printed on the same main surface of the support. An example of such a wavelength conversion member is illustrated in FIGS. 4A and 4B. FIG. 4A is a schematic plan view of a wavelength conversion member 50 as viewed from a main surface side, and FIG. 4B is a schematic plan view of the wavelength conversion member 50 as viewed from a lateral surface side. As illustrated in FIG. 4A, the wavelength conversion layers 52A and 52B are each disposed in a semi-circular arc along the circumference of the disk-shaped support 54. In FIG. 4B, the wavelength conversion layer 52B including the second phosphor 74 and the resin 76, and the wavelength conversion layer 52A including the first phosphor 72 and the resin 76 are respectively formed on one of the main surfaces of the support 54. In FIGS. 2 to 4, the wavelength conversion layer is disposed in a region of a portion of one main surface of the support, but the wavelength conversion layer may be disposed on the entire main surface.

Here, an example of a method for measuring the light emission characteristics of the wavelength conversion member will be described with reference to FIG. 1. FIG. 1 is a schematic configurational diagram of a measurement device for measuring light emission characteristics. The measurement light of a measurement device 100 is a mixed color of light from a light emitting element 10 and light from phosphors contained in the wavelength conversion member 50. The measurement device 100 is provided with: a laser diode that is a light emitting element 10; a condensing lens 32 that condenses light that has been emitted from the light emitting element 10 and passed through a dichroic mirror 20; a wavelength conversion member 50 that converts the wavelength of condensed incident light and reflects the wavelength-converted light; the dichroic mirror 20 that reflects light from the wavelength conversion member 50; a condenser lens 34 that condenses light from the dichroic mirror 20; and a polychromator 40 on which the condensed light is incident and measured. The wavelength conversion member 50 is fixed to a rotating shaft of a motor 60 and is disposed so as to be rotatable by the motor 60.

The light emitting element 10 is, for example, a blue laser diode. Light from the light emitting element 10 may be collimated with a collimating lens. The measurement device 100 may include a plurality of light emitting elements 10. When the measurement device 100 includes a plurality of light emitting elements 10, light from the light emitting elements 10 may be condensed by a condenser lens.

The wavelength conversion member 50 is provided with a wavelength conversion layer 52 that includes phosphors, and a support 54 that holds the wavelength conversion layer 52 and reflects a laser beam and light from the phosphors. Some of the laser beam incident on the wavelength conversion member 50 is subjected to wavelength conversion by the phosphors. The remaining portion of the laser beam that has not been wavelength converted and wavelength converted light from the phosphor are reflected by the support member 54 toward the dichroic mirror 20. Light reflected by the dichroic mirror 20 is condensed by the condensing lens 34 and then incident on the polychromator 40.

A phosphor layer 52 of the wavelength conversion member 50 is formed of phosphors and a resin, and includes a first phosphor and a second phosphor as phosphors. The thickness of the phosphor layer 52 may be, for example, in a range from 30 µm to 400 µm. The support member 54 may be provided with a reflection layer disposed between the support member 54 and the phosphor layer 52, and a heat dissipating body on a side opposite the side on which the phosphor layer 52 is disposed.

Light Emitting Device

The light emitting device is provided with a light emitting element and a wavelength conversion member including phosphors to be excited by the light emitting element. The light emitting element has an emission peak wavelength in a wavelength range of, for example, from 350 nm to 500 nm. The phosphors constituting the wavelength conversion member include a first phosphor and a second phosphor. The first phosphor has a composition represented by Formula (1) and has an emission peak wavelength in a wavelength range from 550 nm to 620 nm. The emission peak wavelength and/or the full width at half maximum of the second phosphor differs from that of the first phosphor. The content percentage of the first phosphor in the wavelength conversion member is in a range from 20 mass % to 80 mass % relative to the total content of the phosphors.

The light emitting device is provided with a wavelength conversion member that has a specific composition and contains a first phosphor and a second phosphor with which an emission peak wavelength and/or a full width at half maximum differs from that of the first phosphor. Also the light emitting device has a wavelength conversion member with the content percentage of the first phosphor being in a predetermined range, and thereby light emission characteristics with good linearity in accordance with the output of the light emitting element configuring the light emitting device can be exhibited. Accordingly, the light emitting device exhibits good light emission characteristics during high output. Details of the wavelength conversion member constituting the light emitting device are described above.

Light Emitting Element

The emission peak wavelength of the light emitting element may be in a wavelength range from 350 nm to 500 nm, and is preferably in a wavelength range from 380 nm to 470 nm, or in a wavelength range from 400 nm to 460 nm. A light emitting device that emits mixed light of light from the light emitting element and fluorescent light from the phosphors can be configured by using, as an excitation light source, a light emitting element having an emission peak wavelength in the above-mentioned range. Furthermore, some of the light emitted from the light emitting element can be effectively used as some of the light exiting to the outside from the light emitting device, and therefore a light emitting device having high light emission efficiency can be obtained.

The full width at half maximum of the emission spectrum of the light emitting element may be, for example, 30 nm or less. As the light emitting element, for example, a semiconductor light emitting element that uses a nitride-based semiconductor is preferably used. A stable light emitting device that exhibits high efficiency and a high level of output linearity with respect to input, and that is strong against mechanical impact can be obtained by using a semiconductor light emitting element as an excitation light source. The light emitting element may be a light emitting diode or a laser diode. In addition, one type of light emitting element may be used alone, or two or more types may be used in combination.

As a density of light power emitted to the wavelength conversion member, the output of the light emitting element may be, for example, 0.5 W/mm$^2$ or more, preferably 5 W/mm$^2$ or more, or 10 W/mm$^2$ or more. The output of the light emitting element may be, for example, 1000 W/mm$^2$ or less, and is preferably 500 W/mm$^2$ or less, or 150 W/mm$^2$ or less. When the output of the light emitting element is in the ranges described above, light emission characteristics with further better linearity in accordance with the output of the light emitting element can be achieved.

Figure 5:
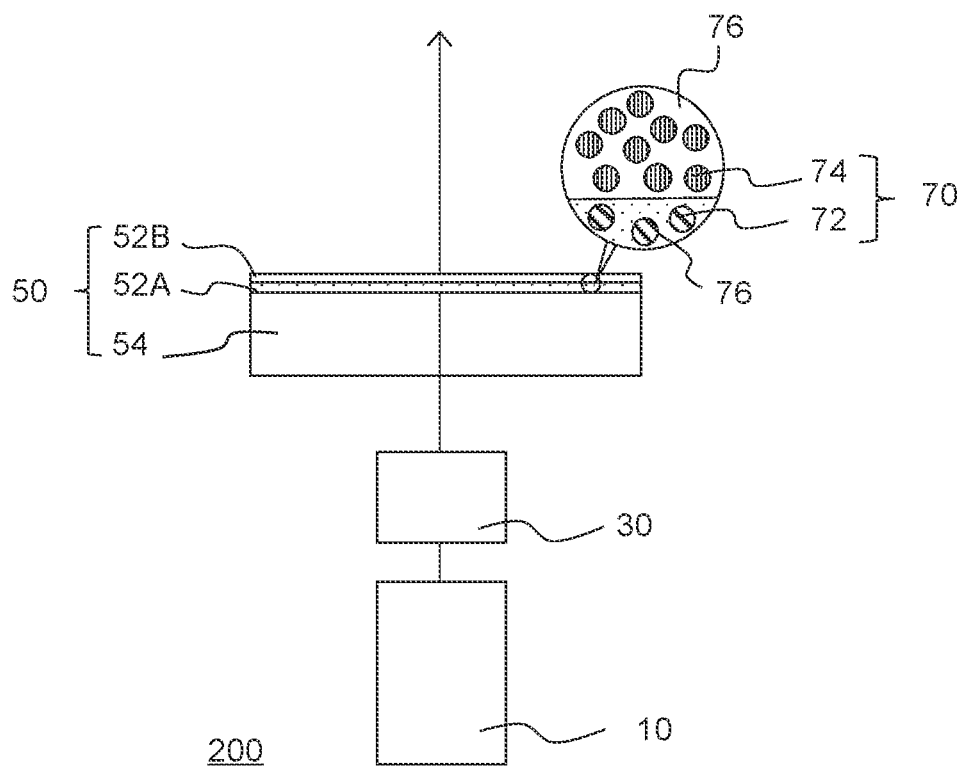
FIG. 5 is a schematic configurational diagram illustrating an example of a light emitting device.

A configurational example of the light emitting device is described here with reference to the drawings. FIG. 5 is a schematic configurational diagram illustrating an example of a configuration of a light emitting device. A light emitting device 200 is provided with a light emitting element 10, an incident optical system 30, and a wavelength conversion member 50. The wavelength conversion member 50 is provided with a wavelength conversion layer 52A that is disposed on a support 54 and includes a first phosphor 72, and a wavelength conversion layer 52B that is disposed on the wavelength conversion layer 52A and includes a second phosphor 74. Light emitted from the light emitting element 10 passes through the incident optical system 30, is incident on the wavelength conversion member 50 from the support 54 side, and passes through the wavelength conversion layer 52A including the first phosphor 72 and the wavelength conversion layer 52B including the second phosphor 74 in that order, and some of the incident light is wavelength converted by the first phosphor and the second phosphor, respectively, and exits along with the remainder of the incident light that has not been wavelength converted. Therefore, the light exiting from the light emitting device is a mixed color of light from the light emitting element 10 and light that has been subjected to wavelength conversion.

Figure 6:
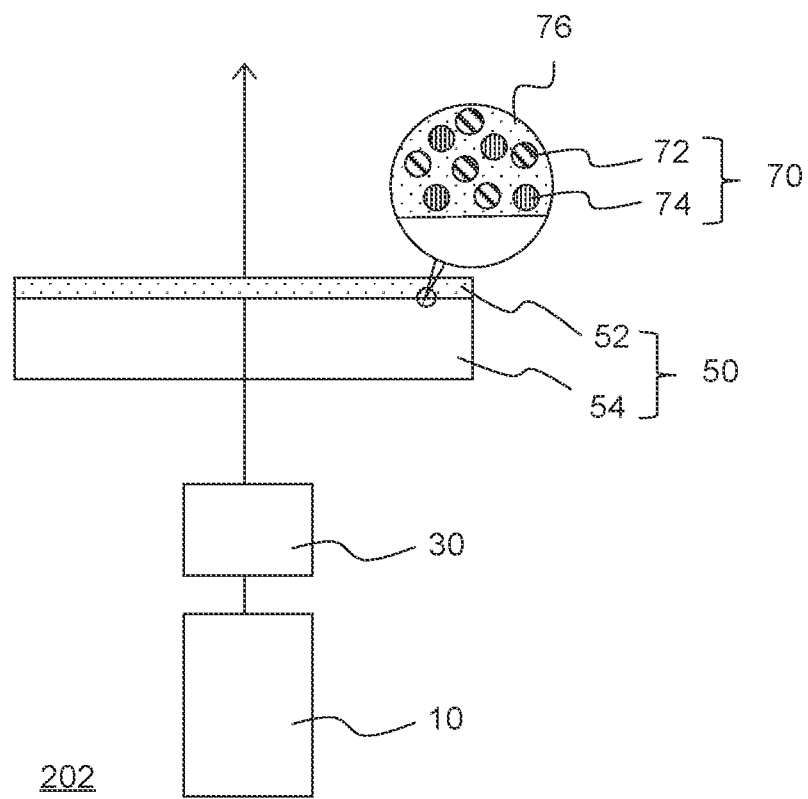
FIG. 6 is a schematic configurational diagram illustrating another example of a light emitting device.
Figure 7:
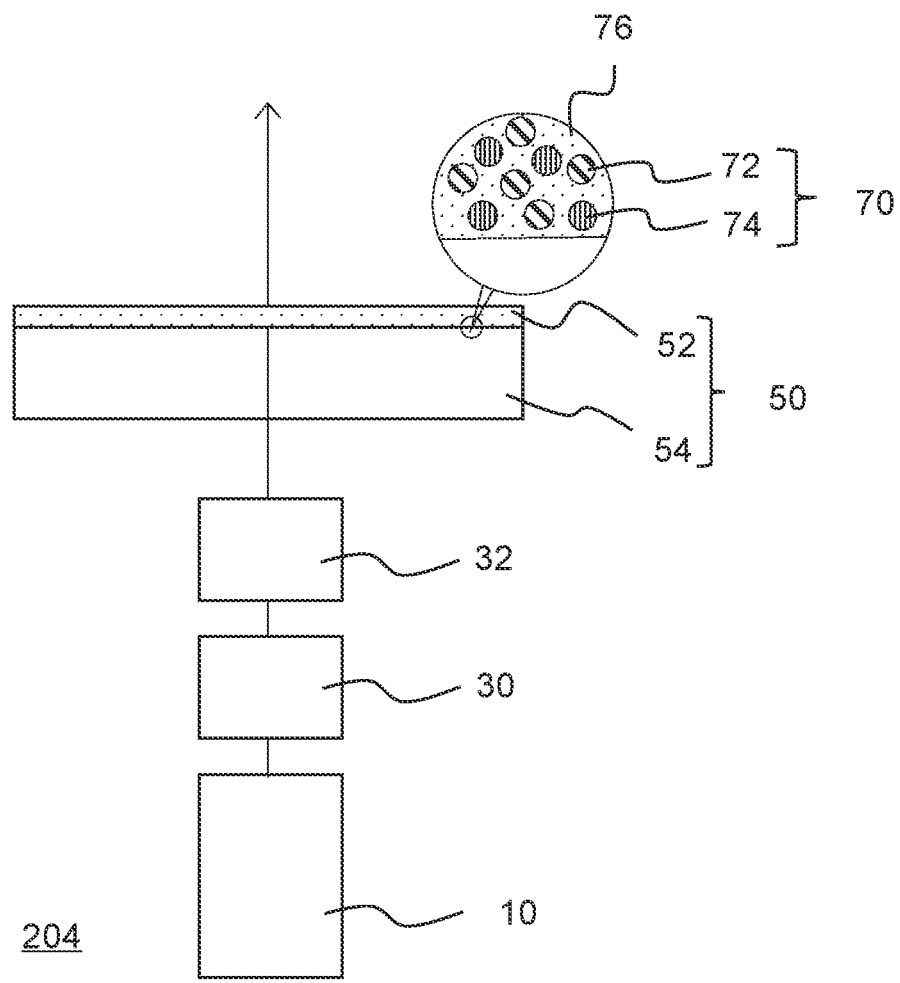
FIG. 7 is a schematic configurational diagram illustrating another example of a light emitting device.
Figure 8:
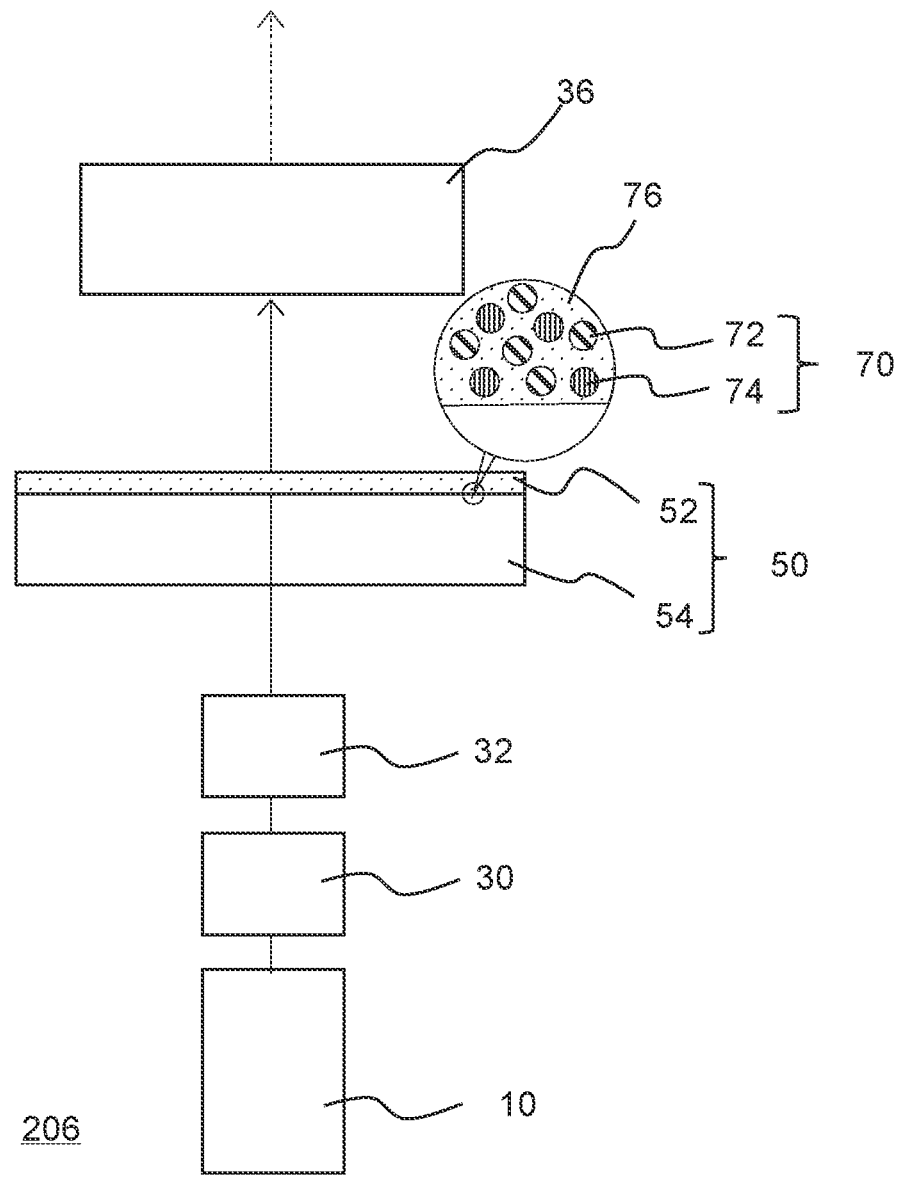
FIG. 8 is a schematic configurational diagram illustrating another example of a light emitting device.

FIG. 6 is a schematic configurational diagram illustrating another example of a configuration of a light emitting device. A light emitting device 202 is provided with a light emitting element 10, an incident optical system 30, and a wavelength conversion member 50. The light emitting device 202 is configured in the same manner as the light emitting device 200 with the exception that the wavelength conversion member 50 is provided with a wavelength conversion layer 52 that includes phosphors 70 that are a mixture of the first phosphor 72 and the second phosphor 74. FIG. 7 is a schematic configurational diagram illustrating another example of a configuration of a light emitting device. A light emitting device 204 is configured in the same manner as the light emitting device 202 with the exception that the light emitting device 204 is provided with a condensing lens 32 between the incident optical system 30 and the wavelength conversion member 50. FIG. 8 is a schematic configurational diagram illustrating another example of a configuration of a light emitting device. A light emitting device 206 is configured in the same manner as the light emitting device 204 with the exception that the light emitting device 206 is further provided with a color filter 36 in the emission direction of light from the wavelength conversion member 50. The light exiting from the light emitting device 206 is light of a wavelength range that has passed through the color filter 36.

Figure 9:
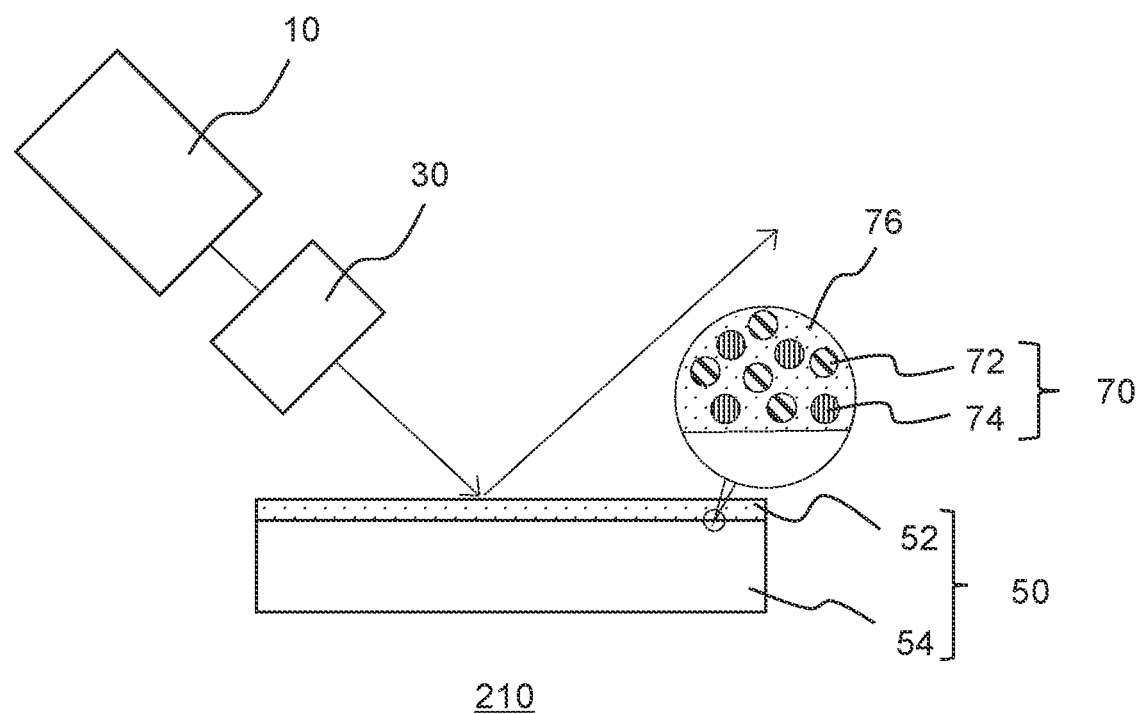
FIG. 9 is a schematic configurational diagram illustrating another example of a light emitting device.

FIG. 9 is a schematic configurational diagram illustrating an example of a configuration of a light emitting device. A light emitting device 210 is provided with a light emitting element 10, an incident optical system 30, and a wavelength conversion member 50. The wavelength conversion member 50 is provided with a support 54 and a wavelength conversion layer 52 that is disposed on the support 54 and includes phosphors 70 that are a mixture of the first phosphor 72 and the second phosphor 74. Light emitted from the light emitting element 10 passes through the incident optical system 30, is incident on the wavelength conversion member 50 from the wavelength conversion layer 52 side, passes through the wavelength conversion layer 52, and is reflected by the support 54 and exits from the wavelength conversion layer 52. Some of the light passing through the wavelength conversion layer 52 is wavelength converted by the first phosphor 72 and the second phosphor 74, respectively. Therefore, the light exiting from the light emitting device 210 is a mixed color of light from the light emitting element 10 and light that has been subjected to wavelength conversion.

Figure 10:
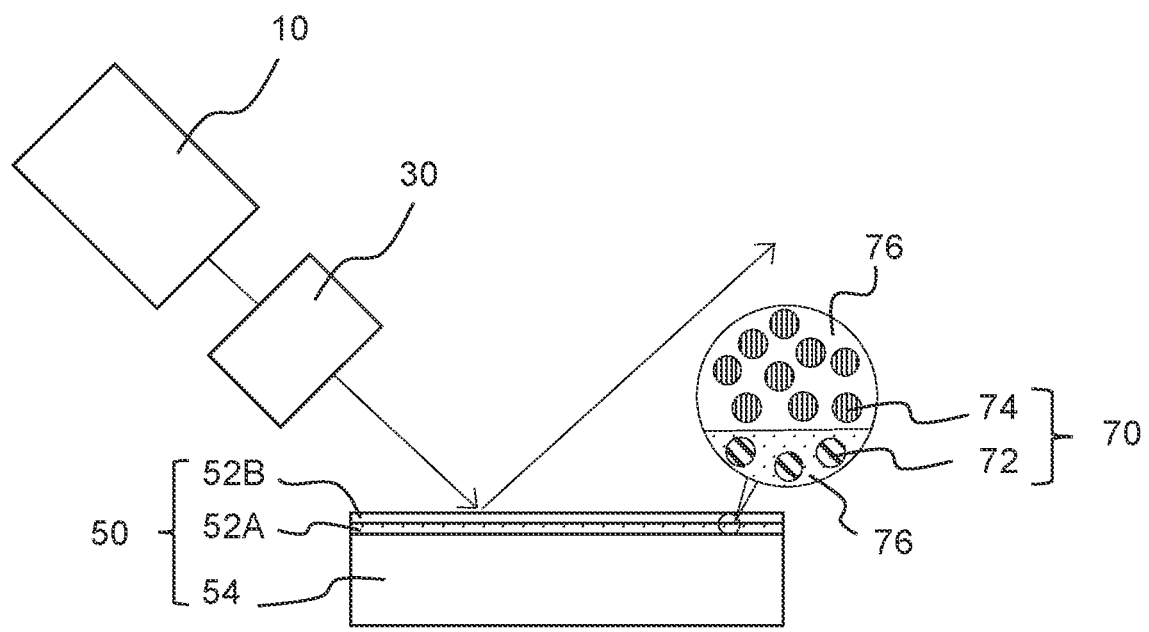
FIG. 10 is a schematic configurational diagram illustrating another example of a light emitting device.
Figure 11:
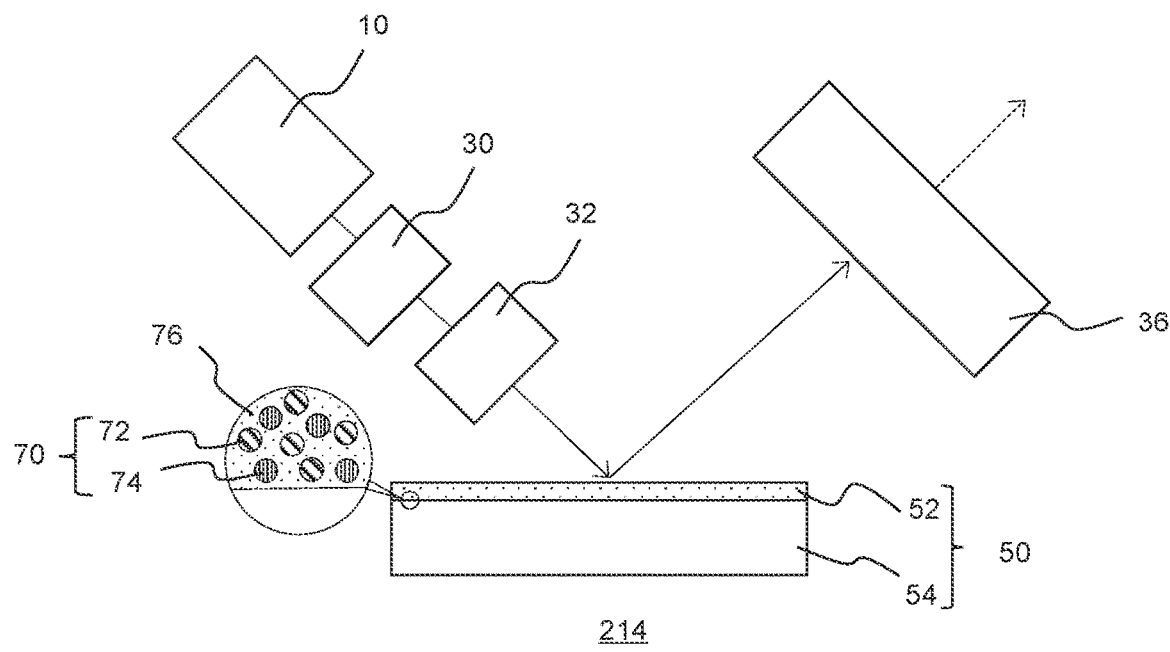
FIG. 11 is a schematic configurational diagram illustrating another example of a light emitting device.

FIG. 10 is a schematic configurational diagram illustrating another example of a configuration of a light emitting device. A light emitting device 212 is configured in the same manner as the light emitting device 210 with the exception that the wavelength conversion member 50 is provided with a wavelength conversion layer 52A that is disposed on the support 54 and includes the first phosphor 72, and a wavelength conversion layer 52B that is disposed on the wavelength conversion layer 52A and includes the second phosphor 74. FIG. 11 is a schematic configurational diagram illustrating another example of a configuration of a light emitting device. A light emitting device 214 is provided with a light emitting element 10, an incident optical system 30, a condensing lens 32, a wavelength conversion member 50, and a color filter 36. The light emitting device 214 is configured in the same manner as the light emitting device 210 with the exception that the condensing lens 32 is provided between the incident optical system 30 and the wavelength conversion member 50, and light from the wavelength conversion member 50 is passed through the color filter 36 and exits. The light exiting from the light emitting device 214 is light of a wavelength range selected by the color filter 36.

Projector Light Source Device

A projector light source device is configured to include a light emitting device described above. A high output projector can be configured by including a light emitting device having good light emission characteristics in high output conditions.

The light emitting device provided with the wavelength conversion member according to the present disclosure can be used not only as a light source device for a projector, but also as a light emitting device provided in a light source of a general lighting apparatus such as a ceiling light; a special lighting apparatus such as a spotlight, stadium lighting, or studio lighting; a vehicle lighting apparatus such as a headlamp; a projection device such as a head-up display; an imaging device such as light for an endoscope, a digital camera, a mobile phone, or a smartphone; and a liquid crystal display device such as a personal computer (PC) monitor, a laptop personal computer, a television, a mobile information terminal (PDX), a smartphone, a tablet PC, or a mobile phone.

EXAMPLES

The present invention will be described in detail below using examples, but the present invention is not limited to these examples.

$La_{1.92}Ce_{0.54}Y_{0.51}Si_6N_{10.8}$ (hereinafter, also referred to as "LYSN") was prepared as a first phosphor. $Lu_{2.98}Al_5O_{12}:Ce_{0.02}$ (hereinafter, also referred to as "LAG") or $Y_{2.89}Al_5O_{12}:Ce_{0.11}$ (hereinafter, also referred to as "YAG") was prepared as the second phosphor. In each phosphor, the chromaticity (x,y), the relative light emission intensity (%) based on YAG as the reference (100%), the emission peak wavelength (nm), and the full width at half maximum (nm) were measured using a quantum efficiency measurement system (QE-2000, available from Otsuka Electronics Co., Ltd.). The results are shown in Table 1.

TABLE 1

| | x | y | Relative Light Emission Intensity (%) | Emission Peak Wavelength (nm) | Full Width at Half Maximum (nm) |
|---|---|---|---|---|---|
| LAG | 0.337 | 0.582 | 106.3 | 523 | 100.1 |
| YAG | 0.481 | 0.51 | 100 | 569 | 120.2 |
| LYSN | 0.484 | 0.51 | 92.7 | 557 | 118.4 |

As shown in Table 1, it is clear that YAG and LAG, which are second phosphors, have a higher light emission intensity as phosphors than the first phosphor LYSN. However, as described below, it can be seen that by configuring a wavelength conversion member that includes, as phosphors, a combination of the first phosphor (LYSN) and a second phosphor (YAG, LAG), the increase of the light emission intensity in the wavelength range that includes red light is particularly large. That is, it is clear that including the first phosphor (LYSN) as a phosphor in a wavelength conversion member that includes, as phosphors, a combination of the first phosphor (LYSN) and the second phosphor (YAG, LAG), significantly affects the increase in light emission intensity.

Examples 1 to 4, Comparative Examples 1 to 6

Phosphor pastes were prepared by mixing phosphors of the types shown in Table 2 below such that the total content of the phosphors was 167 parts by mass based on 100 parts by mass of the silicone resin, which was a binder. As the support, a plate-shaped metal member having a disk shape in a plan view and made of aluminum as the material was used. The phosphor paste was applied onto one main surface of the support by a printing method to form a wavelength conversion layer (phosphor layer), and a wavelength conversion member was obtained.

The type of phosphor and content (parts by mass) thereof, the content (parts by mass) of the resin, and the thickness (μm) of the formed wavelength conversion layer are shown in Table 2 for each of the obtained wavelength conversion members.

The obtained wavelength conversion member is schematically illustrated in FIGS. 2A and 2B. FIG. 2A is a schematic plan view of the wavelength conversion member 50 as viewed from a main surface side, and FIG. 2B is a schematic plan view of the wavelength conversion member 50 as viewed from a lateral surface side. As illustrated in FIG. 2A, a wavelength conversion layer 52 is disposed along the circumference of a disk-shaped support 54. In addition, as illustrated in FIG. 2B, the wavelength conversion layer 52 includes a resin 76 and phosphors 70 including a first phosphor 72 and a second phosphor 74, and is disposed on one of the main surfaces of the support 54.

The content percentages (%) of the first phosphor and the second phosphor included in the wavelength conversion layers of the wavelength conversion members of each of the examples and comparative examples were calculated. The results are shown in Tables 3 to 5 below.

The light emission intensity of each of the wavelength conversion members of the examples and comparative examples was measured as follows. As illustrated in FIG. 1, the disk-shaped wavelength conversion member 50 was fixed to a drive device 60, and the light emission characteristics were measured while rotating the wavelength conversion member 50 at rotational speed of 7200 rpm. As the excitation light source of the wavelength conversion member, a laser diode 10 having an emission peak wavelength of 455 nm was prepared, various optical components were arranged as described above, and the output (W/mm$^2$) of the laser diode was changed stepwise as shown in Tables 3 to 5 below. The light emission intensity (relative Po) of the emitted light of the wavelength conversion member at each output was measured in a range from 460 nm to 830 nm as shown in Table 3, in a range from 460 nm to 550 nm as shown in Table 4, and in a range from 550 nm to 830 nm as shown in Table 5. The light emission intensity was expressed as the relative Po (%) with the light emission intensity of Comparative Example 1 being defined as the reference (100%). In addition, the amount of change in the light emission intensity (relative Po) of the emitted light from the wavelength conversion member between a maximum value (131.9 W/mm$^2$) and a minimum value (7.9 W/mm$^2$) of the output of the laser diode (output of the excitation light source) was calculated as an increase of the light emission intensity.

TABLE 2

|  | YAG (parts by mass) | LYSN (parts by mass) | LAG (parts by mass) | Resin (parts by mass) | Wavelength Conversion Layer Thickness (μm) |
|---|---|---|---|---|---|
| Comparative Example 1 | 5 | 0 | 0 | 3 | 62 |
| Comparative Example 2 | 0 | 5 | 0 | 3 | 67 |
| Comparative Example 3 | 0 | 0 | 5 | 3 | 62 |
| Comparative Example 4 | 3.75 | 0 | 1.25 | 3 | 61 |
| Comparative Example 5 | 2.5 | 0 | 2.5 | 3 | 60 |
| Comparative Example 6 | 1.25 | 0 | 3.75 | 3 | 60 |
| Example 1 | 0 | 3.75 | 1.25 | 3 | 65 |
| Example 2 | 0 | 2.5 | 2.5 | 3 | 61 |
| Example 3 | 0 | 1.25 | 3.75 | 3 | 63 |
| Example 4 | 1.25 | 1.25 | 2.5 | 3 | 65 |

TABLE 3

| | Phosphor Percent (%) | | | Relative Po (%) at 460 nm to 830 nm | | | | |
|---|---|---|---|---|---|---|---|---|
| | YAG | LYSN | LAG | 7.9 W/mm² | 49.4 W/mm² | 91.5 W/mm² | 131.9 W/mm² | Increase |
| Comparative Example 1 | 100 | 0 | 0 | 100 | 100 | 100 | 100 | 0 |
| Comparative Example 2 | 0 | 100 | 0 | 107.5 | 106.4 | 106.4 | 105.9 | −1.6 |
| Comparative Example 3 | 0 | 0 | 100 | 84.7 | 85.5 | 87.1 | 92.9 | 8.2 |
| Comparative Example 4 | 75 | 0 | 25 | 96.1 | 95.2 | 95.2 | 96.4 | 0.3 |
| Comparative Example 5 | 50 | 0 | 50 | 93.3 | 92.5 | 93.2 | 95.9 | 2.6 |
| Comparative Example 6 | 25 | 0 | 75 | 89 | 89 | 89.9 | 93.9 | 4.8 |
| Example 1 | 0 | 75 | 25 | 109.6 | 109.2 | 109.9 | 112.5 | 2.9 |
| Example 2 | 0 | 50 | 50 | 108.1 | 107.3 | 108.1 | 111.3 | 3.2 |
| Example 3 | 0 | 25 | 75 | 103.8 | 103.5 | 104.4 | 108.1 | 4.3 |
| Example 4 | 25 | 25 | 50 | 107.3 | 106.8 | 107.7 | 110.7 | 3.4 |

TABLE 4

| | Phosphor Percentage (%) | | | Relative Po (%) at 460 nm to 550 nm | | | | |
|---|---|---|---|---|---|---|---|---|
| | YAG | LYSN | LAG | 7.9 W/mm² | 49.4 W/mm² | 91.5 W/mm² | 131.9 W/mm² | Increase |
| Comparative Example 1 | 100 | 0 | 0 | 100 | 100 | 100 | 100 | 0 |
| Comparative Example 2 | 0 | 100 | 0 | 63.5 | 59.3 | 55.8 | 51.7 | −11.8 |
| Comparative Example 3 | 0 | 0 | 100 | 209.2 | 212.5 | 218.3 | 234.6 | 25.4 |
| Comparative Example 4 | 75 | 0 | 25 | 109.3 | 108.6 | 109 | 110.9 | 1.6 |
| Comparative Example 5 | 50 | 0 | 50 | 125 | 124.7 | 126.3 | 131 | 6 |
| Comparative Example 6 | 25 | 0 | 75 | 150.1 | 151.2 | 154.3 | 162.5 | 12.5 |
| Example 1 | 0 | 75 | 25 | 96.6 | 93 | 89.7 | 88.1 | −8.5 |
| Example 2 | 0 | 50 | 50 | 107.1 | 103.7 | 101.3 | 101.1 | −6 |
| Example 3 | 0 | 25 | 75 | 128.2 | 126.4 | 126.1 | 128.9 | 0.6 |
| Example 4 | 25 | 25 | 50 | 116.5 | 114.3 | 113.6 | 114.9 | −1.6 |

TABLE 5

| | Phosphor Percentage (%) | | | Relative Po (%) at 550 nm to 830 nm | | | | |
|---|---|---|---|---|---|---|---|---|
| | YAG | LYSN | LAG | 7.9 W/mm² | 49.4 W/mm² | 91.5 W/mm² | 131.9 W/mm² | Increase |
| Comparative Example 1 | 100 | 0 | 0 | 100 | 100 | 100 | 100 | 0 |
| Comparative Example 2 | 0 | 100 | 0 | 120.7 | 120.3 | 121 | 121.2 | 0.6 |
| Comparative Example 3 | 0 | 0 | 100 | 47.6 | 48 | 49 | 52.3 | 4.8 |
| Comparative Example 4 | 75 | 0 | 25 | 92.1 | 91.2 | 91.2 | 92.2 | 0.1 |
| Comparative Example 5 | 50 | 0 | 50 | 83.9 | 83.1 | 83.5 | 85.9 | 2 |
| Comparative Example 6 | 25 | 0 | 75 | 70.8 | 70.7 | 71.3 | 74.3 | 3.4 |
| Example 1 | 0 | 75 | 25 | 113.6 | 114 | 115.8 | 119.5 | 5.9 |
| Example 2 | 0 | 50 | 50 | 108.5 | 108.5 | 110.2 | 114.2 | 5.7 |
| Example 3 | 0 | 25 | 75 | 96.6 | 96.9 | 98.2 | 102.2 | 5.6 |
| Example 4 | 25 | 25 | 50 | 104.6 | 104.7 | 106 | 109.6 | 5 |

As shown in Tables 3 to 5, the wavelength conversion members of Comparative Examples 1 to 3 were formed using only the second phosphor (YAG), the first phosphor (LYSN), or the second phosphor (LAG), respectively. Furthermore, the wavelength conversion members of Comparative Examples 4 to 6 were formed using a combination of only the second phosphors (LAG, YAG) without using the first phosphor (LYSN). The wavelength conversion members of Examples 1 to 4 required the use of the first phosphor (LYSN), and were formed of a combination of the first phosphor (LYSN) and at least one of the second phosphor (LAG) and the second phosphor (YAG).

As shown in Table 3, in the wavelength range from 460 nm to 830 nm, it can be seen that in a condition in which the output of the excitation light source is large, the relative Po of the examples is greater than that of the comparative examples. This is attributed to the temperature characteristics of the first phosphor (LYSN) being better than those of the second phosphors (YAG, LAG), and the difference is considered to be significant under conditions in which the heat emitted around the phosphor becomes large due to the increase in the output of the excitation light source.

As shown in Table 4, in the wavelength range of from 460 nm to 550 nm, it is clear that use of only the second phosphors (YAG, LAG), or use of a combination of the first phosphor (LYSN) with the second phosphors (YAG, LAG) results in an increase of the light emission intensity that is greater than an increase of the light emission intensity of Comparative Example 2, in which only the first phosphor (LYSN) was included as the phosphor. It is also clear that a combination of the first phosphor (LYSN) with the second phosphors (YAG, LAG) results in an increase that is greater than that of Comparative Example 2, in which only the first phosphor (LYSN) was included as the phosphor.

As shown in Table 5, it is clear that in the wavelength range from 550 nm to 830 nm, by combining the first phosphor (LYSN) with the second phosphors (YAG, LAG), all of the examples exhibited a greater increase of the light emission intensity than an increase of the light emission intensity of the comparative examples. It is also clear that Example 1, in which the phosphor percentage of the first phosphor (LYSN) was large, has a greater increase of the light emission intensity than an increase of the light emission intensity of Examples 2 to 4.

The wavelength conversion member or light emitting device of the present disclosure can be used, for example, as a wavelength conversion member or light emitting device provided in a light source of a general lighting apparatus such as a ceiling light; a special lighting apparatus such as a spotlight, stadium lighting, or studio lighting; a vehicle lighting apparatus such as a headlamp; a projection device such as a projector or head-up display; an imaging device such as light for an endoscope, a digital camera, a mobile phone, or a smartphone; and a liquid crystal display device such as a personal computer (PC) monitor, a laptop personal computer, a television, a mobile information terminal (PDX), a smartphone, a tablet PC, or a mobile phone.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A wavelength conversion member comprising a support and a wavelength conversion layer, the wavelength conversion layer being disposed on the support and containing phosphors;

the phosphors including:
a first phosphor having a composition represented by Formula (1), and having an emission peak wavelength in a wavelength range from 550 nm to 620 nm; and
a second phosphor having a different emission peak wavelength and/or a full width at half maximum from the first phosphor;
wherein an amount of the first phosphor in the wavelength conversion layer is in a range from 20 mass % to 80 mass % relative to a total amount of the phosphors:

$$La_p Ce_q M^1_r Si_6 N_8 \qquad (1)$$

where in Formula (1), $M^1$ represents at least one selected from the group consisting of rare earth elements other than La and Ce, a total molar content percentage of Y, Gd, and Lu in $M^1$ is 90% or more, and p, q, r, and s satisfy: $2.7 \leq (p+q+r) \leq 3.3$, $0 \leq r \leq 1.2$, $10 \leq s \leq 12$, and $0 < q \leq 1.2$.

2. The wavelength conversion member according to claim 1, wherein the amount of the first phosphor is in a range from 25 mass % to 75 mass % relative to the total amount of the phosphors.

3. The wavelength conversion member according to claim 1, wherein the second phosphor includes a phosphor having an emission peak wavelength in a wavelength range from 450 nm to 550 nm, and a full width at half maximum in a range from 90 nm to 130 nm.

4. The wavelength conversion member according to claim 1, wherein the second phosphor includes at least one selected from the group consisting of a phosphor having a composition represented by Formula (2) and a phosphor having a composition represented by Formula (3):

$$Lu_3(Ga,Al)_5O_{12}:Ce \quad (2),$$

$$Y_3(Ga,Al)_5O_{12}:Ce \quad (3).$$

5. The wavelength conversion member according to claim 4, wherein the second phosphor includes the phosphor having the composition represented by Formula (2) and the phosphor having the composition represented by Formula (3), and an amount of the second phosphors is in a range from 20 mass % to less than 80 mass % relative to the total amount of the phosphors.

6. The wavelength conversion member according to claim 4, wherein the amount of the second phosphors is in a range from 25 mass % to 75 mass % relative to the total amount of the phosphors.

7. The wavelength conversion member according to claim 1, wherein, in Formula (1), a molar content percentage of Y in $M^1$ is 90% or more.

8. A light emitting device comprising:
   the wavelength conversion member according to claim 1; and
   a light emitting element having an emission peak wavelength in a wavelength range from 350 nm to 500 nm.

9. The light emitting device according to claim 8, wherein the light emitting element is a laser diode.

* * * * *